United States Patent
Marquart et al.

(10) Patent No.: US 11,685,357 B2
(45) Date of Patent: Jun. 27, 2023

(54) COMMUNICATION METHOD BETWEEN A BRAKE BOOSTER OF A VEHICLE AND AN ESP CONTROL UNIT OF THE VEHICLE, AND A BRAKE SYSTEM

(71) Applicant: Robert Bosch GmbH, Stuttgart (DE)

(72) Inventors: Martin Marquart, Reichenbach (DE); Florian Haag, Ellhofen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 229 days.

(21) Appl. No.: 16/959,287

(22) PCT Filed: Nov. 30, 2018

(86) PCT No.: PCT/EP2018/083123
§ 371 (c)(1),
(2) Date: Jun. 30, 2020

(87) PCT Pub. No.: WO2019/149406
PCT Pub. Date: Aug. 8, 2019

(65) Prior Publication Data
US 2021/0053545 A1  Feb. 25, 2021

(30) Foreign Application Priority Data
Jan. 30, 2018  (DE) .......................... 102018201408.6

(51) Int. Cl.
*B60T 17/22*  (2006.01)
*B60T 8/172*  (2006.01)
(Continued)

(52) U.S. Cl.
CPC ............ *B60T 17/221* (2013.01); *B60T 8/172* (2013.01); *B60T 8/885* (2013.01); *B60T 13/146* (2013.01);
(Continued)

(58) Field of Classification Search
CPC ........... B60T 2270/40; B60T 2270/413; B60T 17/221; B60T 8/885; B60T 13/146;
(Continued)

(56) References Cited

U.S. PATENT DOCUMENTS 3,637,264 A * 1/1972 Leiber ...................... B60T 8/58
    303/61
5,218,996 A * 6/1993 Schmitt-Matzon ... B60T 15/028
    303/119.2
(Continued)

FOREIGN PATENT DOCUMENTS

| CN | 102081195 A | 6/2011 |
| CN | 103328251 A | 9/2013 |

(Continued)

OTHER PUBLICATIONS

International Search Report for PCT/EP2018/083123, dated Feb. 13, 2019.

*Primary Examiner* — Bradley T King
(74) *Attorney, Agent, or Firm* — Norton Rose Fulbright US LLP; Gerard Messina

(57) ABSTRACT

A communication method between a brake booster of a vehicle and an ESP control unit of the vehicle. In the method, a signal is coupled into a brake fluid, transported between the brake booster and the brake control unit over a brake line filled with the brake fluid, and extracted again from the brake fluid.

15 Claims, 1 Drawing Sheet

(51) Int. Cl.
B60T 8/88 (2006.01)
B60T 13/14 (2006.01)
B60T 13/66 (2006.01)
B60T 13/68 (2006.01)

(52) U.S. Cl.
CPC .......... B60T 13/662 (2013.01); B60T 13/686 (2013.01); B60T 2270/402 (2013.01); B60T 2270/406 (2013.01); B60T 2270/413 (2013.01)

(58) Field of Classification Search
CPC ................ B60T 13/662; B60T 13/686; B60T 2270/402; B60T 2270/406; B60W 50/023; B60W 2050/0292
See application file for complete search history.

(56) References Cited

U.S. PATENT DOCUMENTS

| | | | | |
|---|---|---|---|---|
| 8,950,828 | B2* | 2/2015 | Martin | B60T 8/368 |
| | | | | 303/119.2 |
| 9,915,947 | B1* | 3/2018 | LaForge | G05D 1/0077 |
| 9,970,557 | B2* | 5/2018 | Loewen | B60T 8/00 |
| 10,850,683 | B1* | 12/2020 | Tippelhofer | B60T 17/04 |
| 2002/0023242 | A1* | 2/2002 | Kidokoro | B60T 8/885 |
| | | | | 714/E11.002 |
| 2008/0154454 | A1 | 6/2008 | Lehner et al. | |
| 2011/0130900 | A1* | 6/2011 | Fuchs | F02D 41/26 |
| | | | | 701/1 |
| 2011/0282525 | A1* | 11/2011 | Kraeling | B61L 15/0036 |
| | | | | 701/19 |
| 2016/0137175 | A1* | 5/2016 | Bunk | B60T 8/172 |
| | | | | 701/78 |
| 2017/0225664 | A1* | 8/2017 | Beever | B60T 13/686 |
| 2017/0267218 | A1* | 9/2017 | Bunk | B60T 13/746 |
| 2018/0022335 | A1* | 1/2018 | Kunz | B60W 40/12 |
| | | | | 303/20 |
| 2018/0290642 | A1* | 10/2018 | Tschiene | B60T 7/12 |
| 2019/0097932 | A1* | 3/2019 | Buczek | H04L 67/12 |
| 2019/0210584 | A1* | 7/2019 | Wood | B60T 8/885 |
| 2020/0327023 | A1* | 10/2020 | Hayes | G06F 11/2048 |
| 2020/0409360 | A1* | 12/2020 | Hwang | B60W 60/0015 |
| 2021/0347370 | A1* | 11/2021 | Nemeth | B60W 50/029 |
| 2021/0387601 | A1* | 12/2021 | Drotleff | B60T 17/221 |

FOREIGN PATENT DOCUMENTS

| | | |
|---|---|---|
| CN | 103534154 A | 1/2014 |
| DE | 102015202337 A1 | 8/2016 |
| DE | 102015224665 A1 | 6/2017 |
| DE | 102015224888 A1 | 6/2017 |
| DE | 102016212412 A1 | 1/2018 |

* cited by examiner

COMMUNICATION METHOD BETWEEN A BRAKE BOOSTER OF A VEHICLE AND AN ESP CONTROL UNIT OF THE VEHICLE, AND A BRAKE SYSTEM

FIELD

The present invention relates to a communication method between a brake booster of a vehicle and an ESP control unit, that is, an electronic stability program control unit, of the vehicle; as well as to a correspondingly configured brake system.

BACKGROUND INFORMATION

Components of a brake system of a vehicle are interconnected over data lines, such as a data bus of the vehicle, and may make data available on the data bus and input data from the data bus. In the case of safety-related components, a plurality of connections to the data line may be provided for redundancy. Particularly important data may also be exchanged over a data line additionally reserved.

SUMMARY

In accordance with the present invention, a communication method between a brake booster of a vehicle and an ESP control unit or electronic stability program control unit of the vehicle, a correspondingly configured brake system, as well as a corresponding computer program product, are provided. Advantageous further refinements and improvements of the approach put forward here are derived from the description herein and the figures.

Specific example embodiments of the present invention may advantageously allow the use of a hydraulic connection between a brake booster of a vehicle and an ESP control unit of the vehicle for communication, without additional hardware expenditure or with little hardware expenditure; the hydraulic connection being, in most cases, necessarily present in the vehicle already. Communication over the brake line may be used as a backup, when normal communication is interrupted, for example, if a plug connector is loose or has a tottering contact, or a wire is cut through or is short-circuited to ground.

A communications method between a brake booster of a vehicle and an ESP control unit of the vehicle is put forward, which is characterized in that a signal is coupled into a brake fluid, transported between the brake booster and the brake control unit over a brake line filled with brake fluid, and extracted again from the brake fluid.

Various aspects of specific embodiments of the present invention may be regarded as, inter alia, based on the concepts and knowledge described herein.

In accordance with an example embodiment of the present invention, a brake booster of a vehicle and an ESP control unit of the vehicle are interconnected directly over at least one brake line. The brake line is a pressure-resistant tube or a pressure-resistant hose. The brake line is filled with approximately incompressible brake fluid. Using a transmitter, a signal may be coupled into the brake fluid as a pulse-like pressure change and/or volume change. In an enclosed volume, the volume change results in a pressure change. The pressure change propagates in the brake fluid in the form of a pressure wave having a specific sonic velocity. Using a receiver, the pressure wave may be extracted from the brake fluid as a volume change or positional change. The transmitter may be operated electrically.

The receiver may generate, in turn, an electrical signal.

At the brake booster, the signal may be coupled into the brake fluid, using at least pulse-like activation of the brake booster. The brake booster may be used as a transmitter. The brake booster has a controllable drive unit. Generally, the drive unit acts upon a master brake cylinder. The master brake cylinder may be actuated at a high actuation rate and low amplitude, in order to release at least one pressure wave in the brake fluid. The actuation rate may be considerably higher than an actuation rate producible in the case of brake manipulation by a driver of the vehicle. The amplitude may be considerably less than an amplitude at the master brake cylinder necessary for actuating friction brakes of the vehicle. The signal may also be coupled in, while the driver manipulates the brake.

At the ESP control unit, the signal may be extracted from the brake fluid by a pressure sensor of the ESP control unit. The pressure sensor may be used as a receiver. The pressure sensor may reflect rapid pressure fluctuations in an electrical pressure signal. The pressure sensor may also reflect small pressure differences in the pressure signal. The pressure signal may also be demodulated, in order to obtain the signal.

A predefined sequence of pulses may be coupled into the brake fluid as a signal. Different data may be encoded and transmitted, using different sequences. Using a plurality of pulses succeeding each other, the signal may be transmitted reliably, even if, for example, an interfering pulse overlaps the signal or the signal is not extracted completely.

By coupling it into the brake fluid, the signal may be transported on the brake line, if a failure of a parallel communication path over a communications bus of the vehicle is detected. The communication over the brake line may be reserved for faults. Alternatively, during closed-loop control, communication may be carried out simultaneously over the brake line and the communications bus, and the failure of the communications bus may be detected, if communication is only able to take place over the brake line.

After the failure is detected, a waiting time may be allowed to elapse, before the signal is coupled into the brake fluid. If the communications bus only stops functioning for a short time, the transmission of contradictory signals may be prevented by the waiting time. The waiting time may allow the brake booster and the ESP control unit to synchronize.

In the ESP control unit, at least one valve may be closed when the signal is transported. By closing valves to friction brakes of the brake system, the friction brakes may be prevented from being actuated by the signal. After a short waiting time, or after the signal has been extracted, the valve may be opened again.

At the brake booster, the signal may be coupled into the brake fluid, using a transmitting unit of the brake booster. The brake booster may include an additional transmitting unit. The transmitting unit may have a greater activation rate than the brake booster. The transmitting unit may have a smaller stroke than the brake booster. The transmitting unit may couple higher frequencies into the brake fluid than the brake booster. Due to the higher frequencies, more data may be transmitted in a shorter time. The transmitting unit may be a sonic transmitter, in particular, an ultrasonic transmitter.

At the ESP control unit, the signal may be extracted from the brake fluid, using a receiving device of the ESP control unit. The ESP control unit may include an additional receiving device. The receiving device may have a shorter stroke than the pressure sensor. The receiving device may extract higher frequencies from the brake fluid than the pressure sensor. Due to the higher frequencies, more data may be transmitted in a shorter time. The receiving device may be a sonic receiver, in particular, an ultrasonic receiver.

At the ESP control unit, the signal may be coupled into the brake fluid, using a transmitting unit of the ESP control unit, and at the brake booster, it may be extracted from the brake fluid, using a receiving device of the brake booster. The signal may also be transmitted by the ESP control unit and received by the brake booster. Thus, communication is also possible in the opposite direction. Signals may also be transported through the brake fluid in the two directions. To that end, the brake booster and the ESP control unit may have transceiver devices. The transceiver devices may be, for example, ultrasonic vibrator crystals.

The example method may be implemented, for example, as software or hardware or as a mixture of software and hardware, in, for example, a control unit.

The approach put forward here also provides a brake system, which is configured to perform, control and/or implement, in corresponding devices, the steps of a variant of the method put forward here.

Components of the brake system may be controlled, using independent control logic elements. For example, the brake booster may be controlled, using a brake-booster control logic element. The ESP control unit may be controlled, using a control logic element. A control logic element may be an electrical device including at least one processing unit for processing signals or data, at least one storage unit for storing signals or data, at least one interface and/or a communications interface for reading in or outputting data, which are embedded in a communications protocol. The processing unit may be, for example, a signal processor, a so-called system ASIC or a microcontroller for processing sensor signals and outputting data signals as a function of the sensor signals. The storage unit may be, for example, a flash memory, an EPROM or a magnetic storage unit. The interface may take the form of a sensor interface for inputting the sensor signals from a sensor, and/or an actuator interface for outputting the data signals and/or control signals to an actuator. The communications interface may be configured to read in or output the data wirelessly and/or by wire. The interfaces may also be software modules that are present, for example, in a microcontroller, next to other software modules.

Additionally advantageous, is a computer program product or computer program including program code, which may be stored in a machine-readable carrier or storage medium, such as a solid state memory, a hard disk storage device or an optical storage device and is used for performing, implementing and/or controlling the steps of the method according to one of the above-described specific embodiments, in particular, when the program product or program is executed on a computer or a device.

BRIEF DESCRIPTION OF THE DRAWINGS

Below, specific embodiments of the present invention are described with reference to the figures, in which case neither the figures, nor the description are to be interpreted as limiting to the present invention.

BRIEF DESCRIPTION OF THE DRAWINGS

Figure 1:
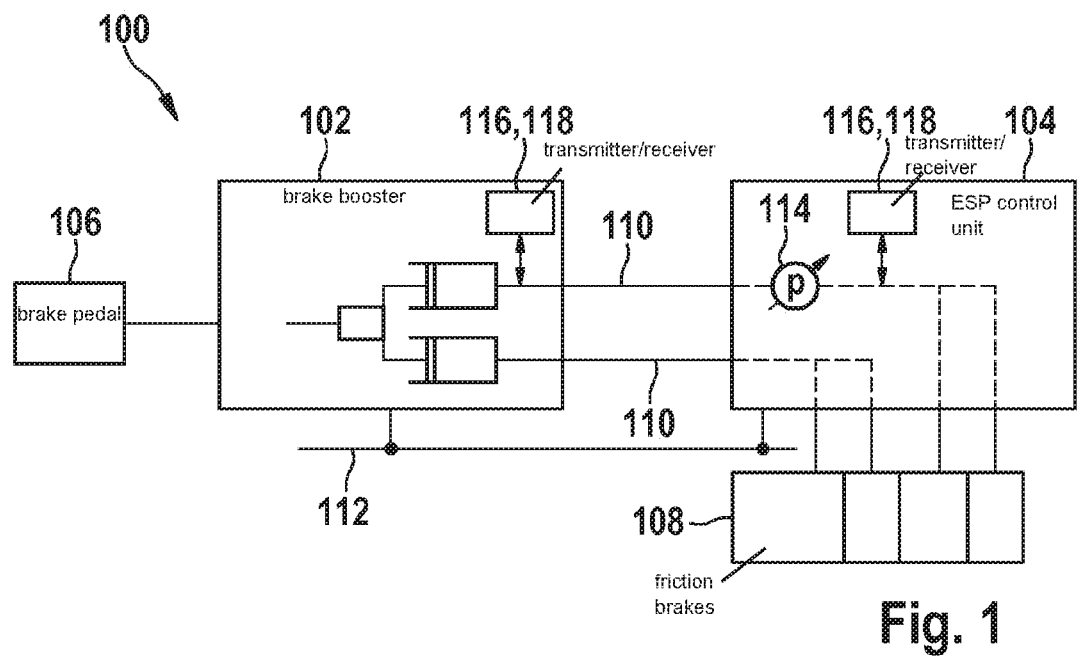

FIG. 1 shows a block diagram of a brake system of a vehicle.

Figure 2:
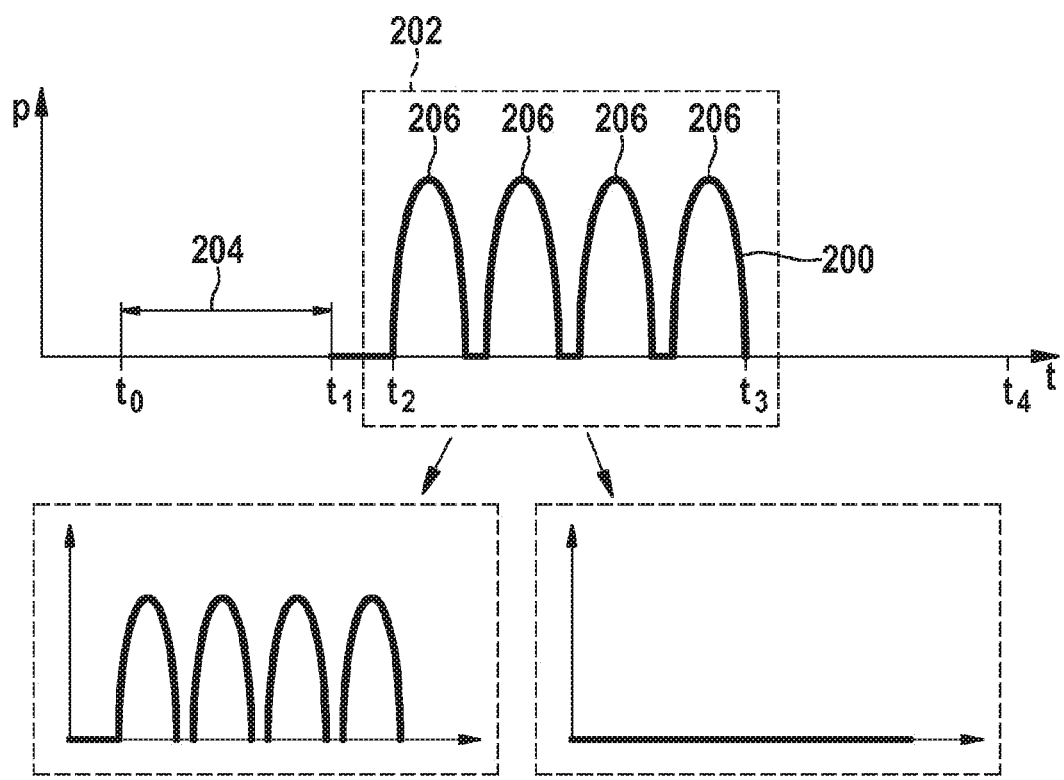

FIG. 2 shows a representation of a pressure characteristic of hydraulic communication according to an exemplary embodiment.

The figures are merely schematic and are not true to scale. In the figures, identical reference numerals denote like features or features functioning in the same manner.

DETAILED DESCRIPTION OF EXAMPLE EMBODIMENTS

FIG. 1 shows a block diagram of a brake system 100 of a vehicle. Brake system 100 includes a brake booster 102 and an ESP control unit 104 as components. Brake booster 102 is mechanically coupled to a brake pedal 106 of the vehicle. ESP control unit 104 is coupled hydraulically to friction brakes 108 of the vehicle. Brake booster 102 acts upon a master brake cylinder of the brake system. Brake booster 102 is connected to ESP control unit 104 via two brake lines 110. Each brake line 110 powers a brake circuit of brake system 100. Brake booster 102 moves one piston of the master brake cylinder per brake circuit. When the pistons are moved, brake fluid is displaced from the master brake cylinder to ESP control unit 104. In ESP control unit 104, the brake fluid is distributed to friction brakes 108. The displaced brake fluid moves brake pistons of friction brakes 108. If a movement of the brake pistons is stopped by contact of the brake pads with the brake disks and/or brake drums, a brake pressure builds up in brake system 100. The brake system 100 described here brakes two wheels of the vehicle per brake circuit.

Brake booster 102 is further connected to ESP control unit 104 via a data bus 112 of the vehicle. During closed-loop control, data are exchanged between brake booster 102 and ESP control unit 104 via data bus 112. Data bus 112 is, for example, a CAN bus of the vehicle.

In accordance with an example embodiment of the present invention, brake system 100 is controlled in such a manner, that a signal is coupled into the brake fluid by at least one of the components, transmitted via brake line 110, and extracted from the brake fluid by the other component, and evaluated.

In one exemplary embodiment of the present invention, brake booster 102 is activated, in order to couple the signal into the brake fluid via the master brake cylinder. ESP control unit 104 extracts the signal from the brake fluid, using a pressure sensor 114 positioned in one of the brake circuits. If ESP control unit 104 receives the signal, then it is certain that brake booster 102 is functioning.

If brake booster 102 and/or ESP control unit 104 are unable to receive any data, in particular, of the other respective component, via data bus 112, then a fault is detected. The fault may have a defect of data bus 112 and/or a defect of the other respective component as a cause. Nevertheless, if the signal of brake booster 102 is able to be received, it is recognized that brake booster 102 continues to be able to fulfil its task, and that ESP control unit 104 may continue to be operated, as before.

If ESP control unit 104 does not receive a signal via either data bus 112 or brake lines 110, then there is a high probability that brake booster 102 is defective. ESP control unit 104 may then take over at least part of the boosting of the brake force, using its pumps.

In one exemplary embodiment, brake booster 102 includes a transmitting unit 116 for coupling the signal into the brake fluid. Transmitting unit 116 couples sonic waves into the brake fluid as a signal. The sonic waves may be received by pressure sensor 114. In one exemplary embodiment, ESP control unit 104 includes, as an alternative, a receiving device 118 for extracting the signal from the brake fluid. Different frequencies of sonic waves may be coupled into the brake fluid. For example, ultrasonic waves may be coupled into the brake fluid as signal carriers.

In one exemplary embodiment of the present invention, ESP control unit 104 includes, alternatively or additionally, a transmitting unit 116, while brake booster 102 has a receiving device 118. In this exemplary embodiment, the signal may be transmitted through the brake fluid, from ESP control unit 104 to brake booster 102. Different frequency ranges for the transport directions may allow communication to take place in the two transport directions without interference.

In other words, a brake control system is made up of an electromechanical brake booster 102 and an ESP. In such a brake control system, redundant communication may take place between electromechanical brake booster 102 and the ESP. In this connection, in parallel with the communications bus (e.g., CAN), over which all of the data are sent, an additional line is used, on which a reduced signal range is transmitted. On the side of the ESP, the additional information transmission allows for clear identification of the reason for the absence of the bus signal. Either this is caused by a malfunction of electromechanical brake booster 102 (the transmitter of this signal), or only the transmission path is affected by the malfunction. In this case, electromechanical brake booster 102 is intact. Distinguishing these two cases allows for an optimal response in the ESP. If brake booster 102 is intact, then the ESP behaves passively. However, if the malfunction of brake booster 102 is the reason for the breakdown of the bus communication, then the boosting of the brake force is carried out by the ESP, instead. In this manner, the vehicle is braked neither insufficiently, nor excessively.

The approach put forward here provides a reasonable plan for redundant communication.

Redundant communication may also be implemented, using an additional electrical line. In the approach advanced here, the brake fluid acts as the redundant line, via which hydraulic communication takes place. The components of the brake control system already present are sufficient for this. An implementation exclusively via changes in software is possible.

In the case of a breakdown in the bus communication between brake booster 102 and the ESP, the information as to whether brake booster 102 is functional is transmitted via hydraulic communication. If the cause of a breakdown in the bus communication lies, for example, in a defective microcontroller on the side of brake booster 102, then this simultaneously causes the absence of the boosting of the braking force. However, if the cause is a ruptured bus cable, then, in this case, the boosting of the braking force is retained.

Distinguishing these cases allows the best possible decision for taking over the boosting of the braking force to be made in the ESP.

FIG. 2 shows a representation of a pressure characteristic 200 of hydraulic communication according to an exemplary embodiment of the present invention. For example, pressure characteristic 200 may be extracted from the brake fluid at a pressure sensor of an ESP control unit, as shown in FIG. 1. Pressure characteristic 200 is represented in a graph, which plots time t on its abscissa and pressure p on its ordinate.

In this case, transmission of data on a data bus of the vehicle has been interfered with. At a disturbance time t0, the ESP control unit recognizes that no more data may be received via the data bus. At a first time t1 subsequent to disturbance time t0, the communication method put forward here begins, and the ESP control unit waits for a signal 202 transmitted by the brake booster via the brake fluid.

If, at disturbance time t0, the brake booster is functional and detects the fault, then the communication method put forward here also begins at the brake booster at first time t1. In this instance, the brake booster couples signal 202 into the brake fluid. After a transit time determined by a length of the brake line and the specific sonic velocity in the brake fluid, at a later, second time t2, signal 202 arrives at the ESP control unit and is extracted from the brake fluid. From signal 202, the ESP control unit detects that the brake booster is functional, and that only a communication breakdown of the data bus is present. The arrival of signal 202 ends at a subsequent, third time t3.

If the brake booster is defective, then no signal arrives at the pressure sensor of the ESP control unit at second time t2. If no signal has been received by a subsequent, fourth time t4, then the ESP control unit detects a fault of the brake booster and ends the waiting for a signal 202.

In one exemplary embodiment of the present invention, after disturbance time t0, the brake booster and the ESP control unit allow a waiting time 204 to pass, before the communication method is started at first time t1. Waiting time 204 may be referred to as debounce time. If the communication over the data bus is recognized as functional again within the waiting time, the start of the communication method at first time t1 may be omitted.

In one exemplary embodiment of the present invention, in the ESP control unit, valves to the friction brakes are closed immediately after first time t1. In this manner, the volume of brake fluid is enclosed between the brake booster and the ESP control unit. Thus, in response to the coupling of signal 202 into the enclosed brake fluid, high pressures result at the pressure sensor. After the expected signal 202 has been extracted, the valves are reopened after third time t3.

In one exemplary embodiment of the present invention, a plurality of successive pulses 206 are coupled into the brake fluid as signal 202 and extracted again from the brake fluid at the pressure sensor. Different data may be transported in signal 202 via different pulse sequences. In this case, for example, pulses 206 are coupled into the brake fluid at regular intervals. The spacing between the pulses may be smaller, for example, than what may result from jittery operation by the driver. In this manner, a brake pulse caused by the driver may be reliably distinguished from signal 202.

In other words, FIG. 2 shows an example for implementing hydraulic communication. After the detection of a bus malfunction on the part of the electromechanical brake booster and the elapsing of a debounce time, a characteristic pressure build-up and pressure reduction are carried out. This may be accomplished, for example, by high-frequency operation in a saw-toothed profile or in accordance with the representation in FIG. 2. The high-frequency activation may allow it to be ruled out, that this pressure build-up and pressure reduction has been generated by the driver. Thus, the possibility of the pressure build-up and pressure reduction by the driver may be ruled out, since the driver is physically unable to generate such a high-frequency change in pressure. For example, the activation may take place in a frequency range of five to 100 Hertz. In one exemplary embodiment, activation at 10 Hz is carried out.

In the ESP, after the detection of the breakdown in the bus communication with the electromechanical brake booster, the measured pressure is monitored for characteristic, high-frequency activation. If the characteristic activation is detected, then the operativeness of the brake booster may be deduced from this. If the characteristic pressure signal is absent, then the brake booster is not functional.

In order to prevent an unwanted reactive effect of the high-frequency activation on the vehicle handling, in the ESP, the valves may be closed in the direction of the wheels for the duration of this activation. Due to this, the pressure generated by the brake booster does not reach the wheels. Thus, no braking effect is achieved. Since this measure would also prevent a pressure generated by the driver during manipulation of the brakes to achieve a braking effect, the valves may be reopened immediately in response to detection of pedal manipulation. In addition, the hydraulic communication may be limited to a minimal time window.

For example, the hydraulic communication may take place only one time immediately after the breakdown of the bus communication, since the probability of the occurrence of an additional fault in the further course of operation is only very low.

If the driver is already manipulating the pedal at the moment of the communication breakdown, the signal may be added onto the driver's braking command. Thus, the pressure characteristic generated by the driver, plus the high-frequency activation by the hydraulic communication function, may be monitored in the ESP.

Finally, it should be pointed out that terms, such as "having," "including," etc., do not exclude any other elements or steps, and that terms, such as "a" or "an," do not exclude a plurality.

What is claimed is:

1. A communication method between a brake booster of a vehicle and an ESP control unit of the vehicle, the communication method comprising the following steps:
    coupling a first signal into a brake fluid;
    transporting the first signal between the brake booster and the ESP control unit via a brake line filled with the brake fluid;
    extracting the first signal from the brake fluid, wherein:
        the first signal is a pressure modulation; and
        during the transporting of the first signal, at least one valve via which the brake fluid is transferrable to one or more brakes is closed; and
    opening the at least one valve in response to completion of the pressure modulation of the first signal.

2. The communication method as recited in claim 1, wherein at the brake booster, the first signal is coupled into the brake fluid using at least pulse-like activation of the brake booster.

3. The communication method as recited in claim 1, wherein at the ESP control unit, the first signal is extracted from the brake fluid by a pressure sensor of the ESP control unit.

4. The communication method as recited in claim 1, wherein a predefined sequence of pulses is coupled into the brake fluid as the first signal.

5. The communication method as recited in claim 1, wherein the coupling of the first signal into the brake fluid for the transport of the first signal on the brake line is performed in response to a detection of a failure of a parallel communication path via a communications bus of the vehicle.

6. The communication method as recited in claim 5, wherein the method further comprises waiting for lapse of a waiting time from after the detection of the failure before performing the coupling of the first signal into the brake fluid.

7. The communication method as recited in claim 1, wherein at the brake booster, the first signal is coupled into the brake fluid, using a transmitting unit of the brake booster.

8. The communication method as recited in claim 7, wherein at the ESP control unit, the first signal is extracted from the brake fluid, using a receiving device of the ESP control unit.

9. The communication method as recited in claim 1, wherein at the ESP control unit, the first signal is coupled into the brake fluid using a transmitting unit of the ESP control unit, and at the brake booster, the first signal is extracted from the brake fluid, using a receiving device of the brake booster.

10. The communication method as recited in claim 1, wherein the pressure modulation of the first signal is in a frequency range of 5-100 Hz.

11. The communication method as recited in claim 1, wherein the pressure modulation of the first signal is at a frequency of 10 Hz.

12. The communication method as recited in claim 1, wherein:
    the method further comprises coupling into the brake fluid another pressure modulation as a second signal, and transporting the second signal between the brake booster and the ESP control unit via the brake line in an opposite direction as, and simultaneously with, the first signal; and
    the pressure modulations of the first and second signals are in different frequency ranges.

13. The communication method as recited in claim 10, further comprising:
    determining that the pressure modulation of the first signal is due to the coupling of the first signal into the brake fluid as a communication and is not due to a user brake operation based on a frequency of the pressure modulation being in the frequency range of 5-100 Hz.

14. A brake system, comprising:
    a brake booster of a vehicle; and
    an ESP control unit of the vehicle;
    wherein the brake system is configured to:
        couple a first signal into a brake fluid;
        transport the first signal between the brake booster and the ESP control unit via a brake line filled with the brake fluid; and
        extract the first signal from the brake fluid wherein the first signal is a pressure modulation;
        keep closed at least one valve via which the brake fluid is transferrable to one or more brakes for a duration of the transport of the first signal; and
        open the at least one valve in response to completion of the pressure modulation of the first signal.

15. A non-transitory machine-readable storage medium on which is stored a computer program for communicating between a brake booster of a vehicle and an ESP control unit of the vehicle, the computer program, when executed by a computer, causing the computer to perform a method, the method comprising:
    coupling a first signal into a brake fluid;
    transporting the first signal between the brake booster and the ESP control unit via a brake line filled with the brake fluid;
    extracting the first signal from the brake fluid, wherein:
        the first signal is a pressure modulation; and
        during the transporting of the first signal, at least one valve via which the brake fluid is transferrable to one or more brakes is closed; and opening the at least one valve in response to completion of the pressure modulation of the first signal.

\* \* \* \* \*